United States Patent
Fleming

[15] 3,681,851
[45] Aug. 8, 1972

[54] NOVEL PRODUCTION AND WASTE TREATMENT PROCESS FOR PRODUCING SAID PRODUCT

[72] Inventor: Patrick J. Fleming, 3336 Ivanhoe Drive, Pittsburgh, Pa. 15241

[22] Filed: Nov. 9, 1970

[21] Appl. No.: 88,022

[52] U.S. Cl. ............................34/5, 62/322, 62/379, 62/65
[51] Int. Cl. .................................................F26b 5/06
[58] Field of Search ....34/5, 13, 15, 36; 62/322, 379, 62/65

[56] References Cited

UNITED STATES PATENTS 3,218,725  11/1965  Lamb ............................34/5
3,427,820  2/1969  Hart ............................62/65 X Primary Examiner—Charles Sukalo
Assistant Examiner—W. C. Anderson
Attorney—William S. Britt, Harvey Gold and David V. Trask

[57] ABSTRACT

A novel product of substantially organic composition comprising a fine mixture of substantially biologically stable fragments derived predominantly from food and paper waste and a process for treating municipal waste to produce such a product has now been invented. The process generally involves shredding municipal waste which includes garbage, rubbish, and the like and generally consists at least of a substantial percentage of food and paper waste; freezing said sized waste to temperatures of about −200° F. and below, comminuting said frozen waste to obtain small-sized particles and treating the frozen comminuted material to render it biologically stable. A preferred manner of treating the material to render it biologically stable involves contacting the material with hot air to dry the material and to oxidize partially at least a portion of the material or bacteria present. The dried, biologically stable material produced by this process has unique structure and characteristics. The very dry product has a very low bulk density and has utility, among others, as a substitute for soil.

17 Claims, 3 Drawing Figures

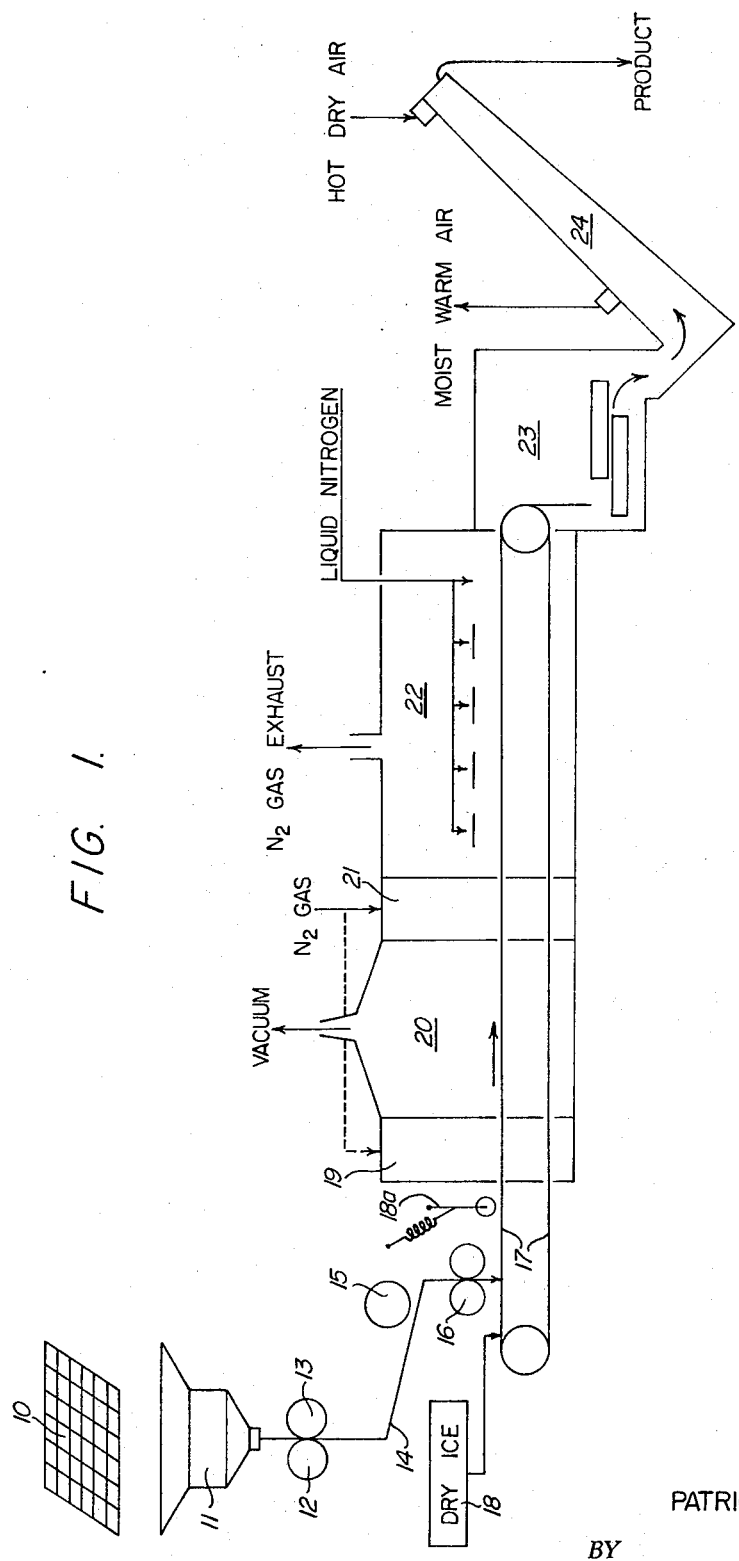

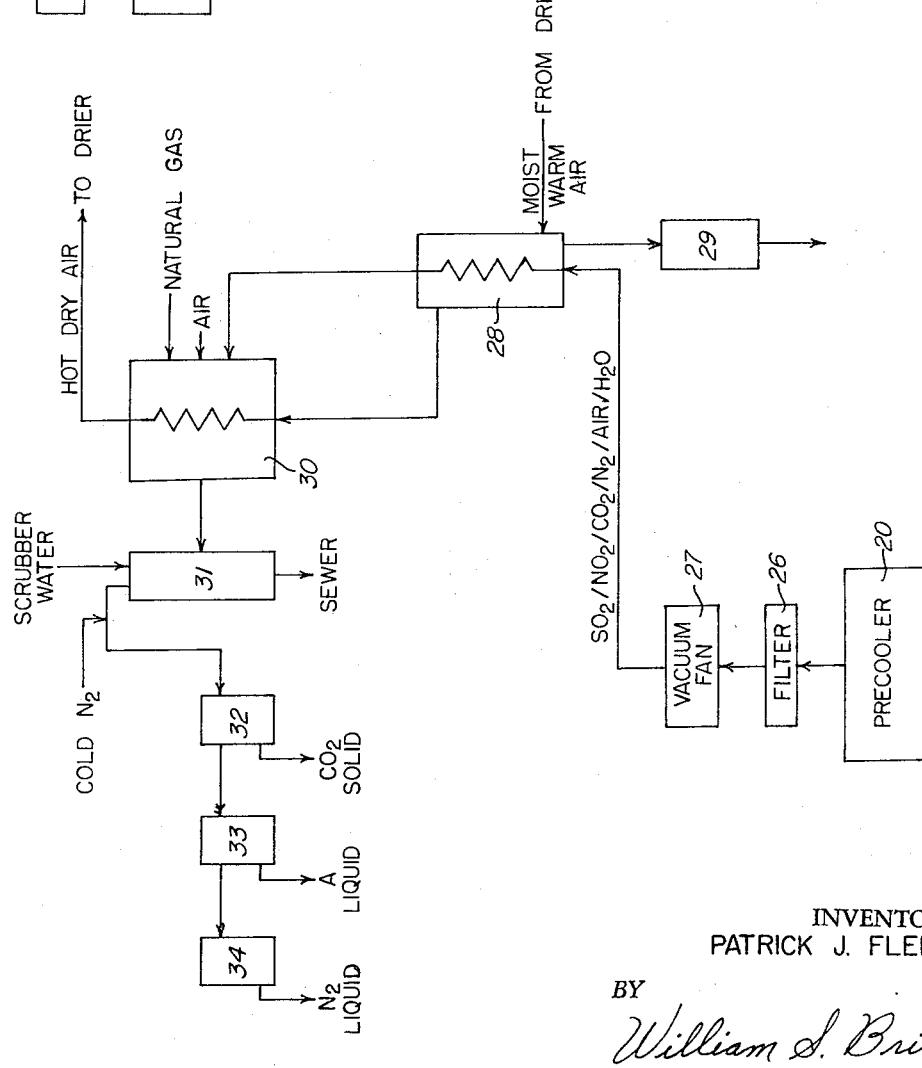

NOVEL PRODUCTION AND WASTE TREATMENT PROCESS FOR PRODUCING SAID PRODUCT

BACKGROUND OF INVENTION

The disposal of municipal waste including garbage, refuse, and other solid waste materials is a present and growing problem. The use of garbage and rubbish per se as land fill has been practiced but is not entirely satisfactory. Raw garbage and rubbish are generally contaminated with bacteria and attract vermin and insects, causing many garbage dumps to be a public nuisance and health hazard. Likewise, if the garbage and rubbish are disposed underground the possibility of contaminating underground water supplies is ever present. Thus, it has been a frequent and common practice to incinerate garbage and rubbish. Incinerated waste products, however, present an air pollution problem so that waste disposal of solid refuse continues to present a pollution problem to society.

The freezing and grinding of various materials has been practiced in the art and is illustrated by U.S. Pat. No. 2,836,368. However, combination freezing and grinding processes have generally been applied to materials which were difficult to grind such as thermoplastic materials which become more fluid as the material is heated due to friction involved in ordinary grinding. The application of freezing and grinding processes to thermoplastic materials is disclosed in U.S. Pat. Nos. 2,347,464 and 3,453,221. Also, freezing processes have been applied to grinding of foods which are frequently adversely affected by the heat generated by conventional grinding processes or the foods contain volatile oils and the like which would be lost at the elevated temperatures which occur during grinding. The application of freezing and grinding techniques to foods is disclosed in U.S. Pat. Nos. 2,583,697 and 3,452,936. In these applications of freezing and grinding techniques the physical or chemical sensitivity of the materials to be ground were a prime consideration in applying cryogenic techniques. In the processing of foods it is becoming increasingly common to prepare dry foods by freezing, grinding, and vacuum dehydrating. The application of heat to obtain dried foods is generally avoided since the structure of the food is adversely affected while dehydrating at cryogenic temperatures is not harmful.

DESCRIPTION OF INVENTION

A new process for converting municipal waste such as garbage, rubbish, and other solid waste products into a new and useful biologically stable product has now been invented. The process, in general terms, comprises sizing solid waste, particularly bacteria-contaminated municipal waste, to a convenient size for handling and heat-transfer purposes, cooling said refuse to a temperature sufficiently low to cause embrittlement thereof, comminuting said brittle refuse while maintaining a very low temperature and contacting said cold, comminuted material with hot, dry air to reduce the moisture content thereof to less than about ten percent by weight and to raise the temperature thereof rapidly above a temperature sufficiently high to stabilize said material. The new product produced by this process has a low bulk density, is non-hygroscopic, porous and has a very low bacteria count. The product has substantially no noxious odor and is useful for numerous purposes.

Further description of the invention may be facilitated by reference to the attached drawings.

FIG. 1 is a process diagram of the main refuse treatment.

FIG. 2 is a process diagram illustrating the carbon dioxide process cycle and the dry air process cycle.

FIG. 3 is a process diagram illustrating the liquid nitrogen cycle.

MAIN PROCESS

In FIG. 1 the main process of the invention is illustrated to indicate preferred processing techniques. The feed material to the process include bulk waste products comprising rubbish, garbage, and other solid and liquid municipal wastes wherein the moisture content of the waste material is generally substantial and often is 50 percent or more of the weight of the feed material. A substantial quantity of garbage and refuse arrives at a disposal station in large plastic bags, paper bags, and often include other large items such as automobile tires and the like. It is preferred, therefore, that the material first be roughly sized by passing it through a grizzle 10 wherein the bars are spaced about three to 4 feet apart in parallel and perpendicular directions. Material which does not pass through the grizzly 10 is removable by an overhead crane or large materials handling equipment.

The refuse passing through the grizzly or large screen then passes through a hopper 11 into large, primary crusher rolls which in a large volume treating plant consist of at least a pair of rolls about 6 to 30 feet in width. The crusher rolls 12 and 13 have a primary purpose of compacting the refuse and spreading it thinly upon a conveyor 14 for subsequent treatment. The crusher rolls preferably contain protrusions on the surface thereof to break open any plastic or paper containers containing refuse. Also, at least one of the crusher rolls should be tensioned so that it will move away from the other crusher roll when a non-crushable object such as a large chunk of reinforced concrete or an engine block or other large non-crushable material passes between the crusher rolls. The tensioned crusher-roll is preferably connected to a limit switch which halts the turning of the rolls and the moving of conveyor 14 whenever the tensioned crusher roll moves away from the other roll. In this manner, the non-crushable object may be removed from the conveyor 14 either manually or by a crane or a plunger or piston-type apparatus sweeping laterally across the surface of the conveyor 14. The primary crusher rolls are preferably continuously cleaned by a high pressure air stream containing sand. This sand blasting removes any sticky, gummy material from the crusher rolls. The sand continues through the process with the refuse material and assists in the final grinding stage. If only household garbage, especially pre-compacted garbage, is used as feed material the crusher rolls may be smaller or even eliminated, although primary crusher rolls are preferred to provide flexibility to the process.

The material passing from the crusher rolls is distributed across the width of a conveyor 14 which may be an endless belt conveyor of fabric, rubber, or metal. The material is preferably deposited substantially uniformly across the conveyor 14 to a depth of less than about one foot and preferably less than about several inches. The conveyor 14 preferably passes the material through a ferrous metal separating station, which in a preferred embodiment comprises a rotating magnetic separator located in close proximity above the conveyor. Although crushed "tin" cans and other small ferrous objects are satisfactorily handled by this invention, it is preferred to remove the ferrous materials before freezing and grinding since they have a substantial scrap value. The rotating magnetic drum 15 illustrated in FIG. 1 is operated to remove ferrous materials from the conveyor and carry said materials to another position of the drum where the ferrous materials may be scraped or otherwise removed and conveyed away from the main processing line. A magnetic belt may, of course, be utilized as at least a portion of conveyor 14 whereby the ferrous materials adhere to the belt which is cleaned of said materials upon its return to receive additional feed materials.

Crushed waste material leaves conveyor 14 and enters secondary crushers 16 which are preferably shredding devices which shred the feed materials into strips or fragments having a maximum dimension of about four inches and preferably having a maximum dimension of about two inches or less. Shredding rolls such as those used for debarking logs are useful as secondary crushers. The shredded refuse passes from roller crusher 16 onto the main process conveyor or cryogenic conveyor which carries the shredded refuse through the cryogenic phases of the process. Before the shredded refuse is deposited on the main conveyor 17 it is preferred that the conveyor be covered with a bed of solid carbon dioxide (dry ice) to a depth of at least about one-quarter inch up to several inches or more. The dry ice may be supplied from outside sources although it is preferably produced as an integral part of the complete process inasmuch as integration of the complete process, including the production of dry ice, offers a number of engineering and economic advantages.

A bed of dry ice is preferably placed on the conveyor prior to depositing thereon the shredded refuse inasmuch as the dry ice very efficiently cools the refuse quickly to a very low temperature in the pre-cooling stage of the process. Cold carbon dioxide gas formed by sublimation of the dry ice, preferably under partial vacuum, passes upwards through the shredded refuse in the pre-cooling chamber, making intimate contact with the refuse. Also, the bed of dry ice helps to keep the main conveyor clean by substantially preventing any of the shredded refuse, much of which is sticky, oily, and gummy, from contacting the conveyor and adhering thereto. A bed of dry ice, in the preferred practicing of the process, is deposited from a dry ice distributor 18 onto the main conveyor 17 to a desired thickness. The shredded refuse is then deposited from secondary crushers 16 onto the bed of dry ice.

The bed of refuse material preferably passes from the secondary crusher station along conveyor 17 to a distribution station wherein a roller or spreading device 18a distributes the shredded refuse across the conveyor to a substantially uniform depth. The refuse is preferably uniformly distributed whether or not a bed of dry ice is previously applied to the conveyor. The distributed bed of refuse leaves the distribution station and preferably passes through an air lock 19 which is preferably purged with a slight positive pressure of cold nitrogen gas. The bed of distributed refuse passes into air-lock 19 through an opening which has preferably a flap-like member which tends to maintain a seal about the conveyor 17 as the material is passed into the air-lock 19. A similar flap-like arrangement is preferably located between air-lock 19 and the pre-cooler 20. The process may be practiced without uniformly distributing the feed materials or without air-lock stations, however, the efficiency and effectiveness of the system are greater when such techniques are included.

Pre-cooling of the shredded refuse is preferred, especially when dry ice is utilized in the system. It is possible, however, in the absence of a pre-cooling chamber, to utilize liquid nitrogen or other liquefied cryogenic gas to cool the shredded refuse from about room temperature to cryogenic temperatures where the shredded refuse becomes embrittled. However, to obtain maximum intimate contact of the cold gases evaporating from the liquefied cryogenic gas, the gases should pass through the refuse material. To accomplish this, a porous web-type belt would be required. The openings of such a belt, however, would have to be relatively small to prevent shredded refuse material from sifting therethrough and creating a cleaning problem in the cooling chambers. Because of the low temperatures in the cryogenic chambers frequent opening for maintenance or cleaning detrimentally affects the efficiency of the process. Also, unless the edges of the conveyor made sealing contact with the chamber walls, the cold gases would tend to bypass the bed of shredded refuse. A dry ice, pre-cooling chamber is, therefore, a preferred embodiment in the practice of this invention.

The pre-cooling station is preferably maintained under slight vacuum, that is, generally about one-third of an atmosphere to about full vacuum, to accelerate the sublimation of the dry ice layer and to dehydrate partially and deliquefy the shredded refuse material. The slight vacuum also increases the $CO_2$ gas velocity through the refuse, improving the heat transfer and creating a chill effect. The pre-cooler preferably cools the refuse material to a temperature of at least about $-30°$ F. although for optimum operation of the system the temperature is lowered to about $-60°$ F. before the material enters the main cooler or freezer. Utilization of a slight vacuum in the pre-cooling chamber facilitates the maintenance of refuse temperatures in the range of about $-60°$ F. with dry ice. Even lower temperatures may be achieved, however, the efficiency of dry ice cooling tends to diminish at temperatures below about $-60°$ F. Dry ice colling is more efficient and effective for cooling the refuse materials to temperatures of about $-60°$ F. than liquid nitrogen.

The shredded, cooled refuse material preferably passes through another air-lock 21 similar in design and operation to air-lock 19. When a carbon dioxide pre-cooler is utilized it is preferred to utilize an air-lock between the pre-cooler and the main cooler to prevent, as much as possible, the contamination of the nitrogen gas in the main cooler with carbon-dioxide gas.

The main cooler may be cooled by any liquefied cryogenic gas capable of achieving temperatures of about $-250°$ F. although liquid nitrogen is preferred. The material in the main cooler or freezer 22 is cooled to temperatures generally in the range of about $-200°$ F. and preferably to a temperature of about −250° F. or lower. Although it is not important that the material be cooled to a precise temperature it is necessary to cool the refuse material until it becomes sufficiently embrittled to permit it to be easily crushed and ground to a fine material. It has been found that for refuse containing only paper products and food, that is, vegetable and animal tissue waste, that a temperature in the range of about −150° F. to about −200° F. is sufficient to cause embrittlement. However, most municipal refuse from household, business and light industry sources contains a substantial amount of plastic or polymeric organic products which do not become sufficiently embrittled until temperatures below about −200° F. and frequently in the range of about −250° F. are attained. It is preferred, therefore, that the process be operated generally in the latter lower temperature ranges.

Liquid nitrogen is preferably applied to the refuse material by spraying. Spraying is preferably practiced by flowing the liquid nitrogen onto a spinning disk. The refuse material can be conveyed through a bath of liquid nitrogen. A portion of the refuse material tends to float on the liquid nitrogen while the remainder sinks, thereby creating a conveying problem. Most of the cooling of the main chamber occurs through evaporation of the liquefied gas inasmuch as the solid carbon dioxide present is quickly cooled to a temperature at which its vapor pressure is very low and, therefore, no appreciable sublimation of $CO_2$ is occurring. The main cooling chamber may be operated under slight vacuum at atmospheric pressure although a slight positive pressure is generally preferred to assist in preventing leakage of warm air or gases into the main cooler. If a dry ice pre-cooling chamber is not utilized then a large main cooling chamber can be used wherein the temperature of the refuse material is lowered from approximately room temperature to its embrittlement temperature. As it has been indicated hereinabove, the use of a pre-cooling system in conjunction with dry ice offers significant advantages to the overall process.

From the main cooler 22, the refuse material advances into the final grinder 23 wherein the cooled refuse is fragmented under cryogenic conditions. Dry ice from the dry ice bed is generally present in conjunction with the cold refuse material and assists in the grinding of the refuse and in maintaining the cold temperature desired. Also, some sand is present if the primary crusher rolls are cleaned by sand blasting. A small amount of liquefied cryogenic gas is preferably introduced into the final grinder. In a preferred operation of the system, liquid argon manufactured in the system is introduced into a final grinder for cooling purposes. Liquid argon is utilized for this purpose since it is produced only in small quantities and has less marketability as a by-product than nitrogen. The final grinding operation is conducted preferably by a hammermill or another type of impact grinder although attrition mills and like grinders are also useful.

Insulation of the final grinding chamber, main cooler, pre-cooler and air locks facilitates the maintaining of desired cryogenic temperatures. The finely ground cold refuse material preferably passes from the final grinder into a dryer 24. The cold finely ground material may be permitted to return to room temperature by natural means or vacuum dehydrated. However, the process is more effective and the product is more useful if drying at elevated temperatures is practiced. It is preferred, therefore, to convey the material from the final grinder 23 into a dryer 24 wherein the temperature of the material is rapidly elevated from about −250° F. or lower up to a temperature preferably above about 150° F. and preferably to a temperature in the range of about 250° F. or above. The rapid change of temperature has been found to assist in stabilizing the material as well as thoroughly drying the material and providing many of the desirable chemical and biological properties of the material.

The dryer illustrated in FIG. 1 contains a screw conveyor to elevate the material from the final grinder to a higher elevation where it may be loaded into storage or transport means. The whole process is designed for an underground location since underground space is more readily available in heavily populated urban areas than surface space. Also, an underground location minimizes any noise issuing from the plant. The screw conveyor-dryer elevates the material from a below-ground position to an above-ground position. Also, the screw conveyor maintains the product as a substantially homogeneous mixture. Other types of dryers may, of course, be used, especially if the process is located above ground. Kiln dryers, fluid bed dryers and similar dryers providing good contact between the hot air and the product is preferred. Also, hot combustion gases may be utilized to dry the product, but hot, dry air is preferred. Stack gases generally have a considerable $CO_2$ and CO content which tends to be a reducing atmosphere while an oxidizing atmosphere is preferred in the dryer. Also, it is preferred to maintain counter-current flow of refuse to the hot air stream in the dryer.

The refuse material exiting from the grinder to the dryer is preferably passed through a high frequency electrical metal separator which tends to recover super-conductor metals such as aluminum, copper, and the like. Also, the refuse product coming from the grinder is preferably passed through a screening station to remove oversized products which are recycled to the final grinder inlet.

The finely ground refuse material entering the dryer enters at a very low temperature, that is, a temperature in the neighborhood of −200° F. to about −250° F. or below and exits from the dryer at a temperature above 150° F. and preferably above about 250° F. The incoming hot, dry air has a temperature above about 200° F. and preferably above about 300° F. Intimate contact of the hot air with the refuse material is preferred inasmuch as some oxidation of the refuse material desirably occurs when in contact with hot air. If desired, aerobic bacteria, enzymes, ammonia, and like materials may be added at a midpoint in the dryer to aid in eliminating any noxious odor that may be present in the refuse material. Aerobic bacteria are substantially inactivated after being in the presence of the hot air for a short duration. Thus, after the aerobic bacteria achieve their purpose the same are substantially inactivated before being discharged with the product from the dryer. Synthetic enzymes are not as easily inactivated and are, therefore, not as useful for the purposes of this invention as aerobic bacteria.

The dryer removes substantially all the remaining moisture in the refuse material. The refuse material is generally dried to a moisture content of less than about 10 percent by weight and preferably dried to a moisture content less than about 5 percent with moisture contents less than about 2 percent being readily obtained under optimum conditions of operation. The vacuum pre-cooler removes a substantial amount of adsorbed moisture. Frequently the adsorbed moisture of the feed exceeds about 30 percent by weight of the water present. Substantially all the adsorbed water is removed in the pre-cooler if a vacuum greater than about one-third atmosphere is applied. The remaining adsorbed water, bound water and water of crystallization are removed in the dryer.

The refuse material preferably undergoes a temperature change of at least about 400° F. and preferably about 500° F. in the drying cycle. For these reasons a vacuum dehydrator is not one of the preferred modes of practicing the instant invention inasmuch as only a slight temperature change occurs in a vacuum dehydrator. The refuse material which issues from a vacuum dehydrator is dry but it does not have some of the other desirable biological, chemical, and physical properties obtained when the product is dried in a heated dryer of the type illustrated in FIG. 1 and described hereinabove. The material issuing from the heater dryer of the type described above is substantially biologically stable while the material issuing from a vacuum dehydrator is not as biologically stable. The term "biologically stable" is intended to describe a product which does not undergo substantial self-activated biological decomposition.

The product issuing from the process set forth in FIG. 1 has a particle size of about one-half inch and preferably from about ¼ inch down to about 1/32 of an inch. This measurement describes the greatest measurement of the particle inasmuch as the fibrous particles are generally very thin and leaf-like particles.

CARBON DIOXIDE CYCLE

In FIG. 2 the carbon dioxide cycle of the process is illustrated wherein the gas stream emanating from the pre-cooler 20 is drawn through a filter to remove small particles of refuse, said filter 26 which can be an electrostatic, cyclonic or mechanical type, being placed between the pre-cooler and the vacuum fan 27. The gas stream coming from the pre-cooler contains carbon dioxide, a small quantity of nitrogen, a small quantity of air, water, and small quantities of sulphur dioxide and various oxides of nitrogen removed from the refuse. This gas stream enters a heat exchanger 28 which is warmed by the moist, warm air stream coming from the dryer. The warm air stream from the dryer enters the exchanger 28 where it comes in contact with cold coils containing the cold gas stream emanating from the pre-cooler. The moisture in the warm air stream is condensed by contact with the cold coils and the condensed water is accumulated in a water accumulator 29. The air-stream leaves the heat exchanger in a cool, dry condition and enters furnace 30 where it is heated to a temperature above about 200° F. and preferably above about 250° F. and, under optimum conditions, in the range of about 300° F. for return to the dryer. The gas stream from the pre-cooler passes through the heat-exchanger 28 and is admixed with air and natural gas in the furnace where it is burned to produce products of combustion which pass into the scrubber 31 to remove substantially all the sulphur oxide and nitrogen oxide compounds.

The gases flow from the water scrubber and are admixed preferably with a small amount of cold nitrogen gas to lower the gas stream temperatures to increase compressor efficiency. The gas stream is then drawn into the carbon dioxide compressor 32 wherein the gases are compressed sufficiently for solid carbon dioxide to be formed when the gas stream is cooled by adiabatic expansion of the pressurized gas. Solid carbon dioxide forms and precipitates from the mixed gas stream. The solid carbon dioxide is recycled to the front of the main conveyor for formation of a dry ice bed on said conveyor. The gas stream is conveyed from the carbon dioxide compression system to a secondary compressor 33 wherein liquid argon is removed. The gas stream finally goes to a nitrogen compressor wherein liquid nitrogen is obtained.

Recycling of carbon dioxide and integral production of dry ice are preferred techniques in this invention. Alternative methods of recycling $CO_2$, removal of water from the moist air stream, heating of the moist air and compression of gases may be practiced, however, the hereinabove described carbon dioxide cycle is a preferred manner of practicing this invention. Since hot air is necessary in the preferred process to operate the dryer, the cost of obtaining solid carbon dioxide is substantially reduced by burning natural gas to heat the hot air and utilizing the products of combustion as a source of gases from which to obtain the coolants used in the system. Furthermore, the system lends itself to being self-supporting so that the only utilities required to operate the process are a source of water for the scrubber, a source of natural gas for the furnace and a source of electricity to energize the compressors. The process produces useful by-products such as an excess of solid dry ice and a substantial excess of liquid nitrogen.

NITROGEN CYCLE

In FIG. 3 the liquid nitrogen which has evaporated in the main cooler or freeze tunnel 22 is returned through a grid cooling system where it cools the pressurized gas coming from the compressor 37 and causes condensation of the nitrogen. The nitrogen gas stream exits the grid cooler 35, flows through an oxygen trap 36, through a compressor 37 and to an accumulator tank 39. Some of the gas coming from the freeze tunnel may be bled to feed cold nitrogen gas to the stream issuing from the scrubber 31 illustrated in FIG. 2. As it has been indicated hereinabove, it is desired to maintain the freeze tunnel under slight positive pressure so that the nitrogen remains in a substantially pure condition. The cold nitrogen gas is used to cool the pressurized gases issuing from the compressors. In this fashion heat energy is conserved, thereby increasing the efficiency of the total system. Makeup nitrogen is available inasmuch as the air introduced into the furnace 20 contains a substantial amount of nitrogen which is ultimately compressed and condensed at the nitrogen compression station 34.

The recycling of cold nitrogen gas and the integral production of liquid nitrogen are preferred techniques in the practice of this invention. Alternative known compression and liquefaction techniques may be practiced, however, heat exchange between cold, low pressure nitrogen gas and hotter, high pressure nitrogen gas is always preferred to improve the efficiency of the process. Make-up nitrogen is available from the $CO_2$ recycle process either as a gas or liquid. Nitrogen gas from the $CO_2$ recycle process may be fed into the nitrogen recycle process at substantially any point upstream of the nitrogen compressor 37.

The cryogenic methods, i.e., compression and liquefaction, applied in the carbon dioxide cycle and the nitrogen cycle are generally known in the art. Recycling of the $CO_2$ and $N_2$ streams from a freezing process employing both solid $CO_2$ and liquid nitrogen and concommitant recycling of the air stream in heat exchange relationship with the recycled $CO_2$ stream have not heretofore been practiced.

FEED, MATERIALS, AND PRODUCT DESCRIPTION

The feed materials for the process of this invention comprise municipal rubbish and garbage which, according to the nature of the community, will include varying amounts of industrial refuse. Although the exact composition of the waste feed product may vary, the nature of the source insures that a certain minimum of organic materials, that is, food, paper, and plastic waste, are present. Furthermore, in a large urban area wherein centralized garbage disposal is practiced, variations are diminished when a composite feed from the various sectors is utilized.

An analysis of typical garbage from various communities has the following approximate composition:

Percent by Weight

| | |
|---|---|
| Moisture | 60 to 85 |
| Volatile Matter (Includes carbon) | 10 to 35 |
| Ash | 2.0 to 7.0 |

Although the feed materials to the instant process generally consist substantially of garbage, a varying amount of rubbish is frequently present in the feed. Although the attainment of a product of substantially uniform properties is facilitated by a supply of feed materials of a substantially constant range of composition, the process is nevertheless useful for feed materials wherein substantially any mixture of solid waste products is present.

Rubbish, for example, generally contains less food waste than garbage and has a typical analysis as follows:

| | |
|---|---|
| Moisture | 7.0 % |
| Volatiles | 60.0 % |
| Fixed Carbon | 13.0 % |
| Ash | 20.0 % |

The moisture content of rubbish may, however, vary up to about 56 percent by weight. Thus, a substantial percentage of the weight of the feed material of the instant process is, in any case, water. Since metallic substances are generally separated in the process so that they do not appear in any substantial quantity in the final product the only inorganic material of consequence which is not removed is glass. Therefore, regardless of the starting materials the final product is substantially organic in nature and generally comprises substantial quantities of material derived from vegetable, meat, paper and plastic wastes.

After the moisture and metal content of garbage and mixtures of garbage and rubbish are removed it is found that a substantial quantity of the remaining materials are waste products of vegetable materials, meat tissues, paper and plastic. Upon processing of such materials, a product which is substantially organic in nature is formed. The product possesses a relatively small particle size, generally in the range of about one-quarter inch or less wherein the largest dimension of the particle is about one-quarter inch. The product generally is plate or leaf-like and has an open, fibrous, structure. The material is very porous and non-hygroscopic. The product produced from a typical mixture of garbage and rubbish generally has a moisture content less than about 10 percent by weight and frequently below about 2 percent by weight. Because a substantial quantity of the product is derived from vegetable matter and paper products the resulting product has a substantial cellulosic content.

It has been found that the product produced from the typical mixture of garbage and rubbish having a substantial content of food, paper, and plastic waste in various degrees of decay possessed an excellent adsorption for oil. Also, the product of this invention is sufficiently light and non-hygroscopic so that it floats on water and adsorbs any oil present thereon. Also, it was found that the product supported plant life and, in many cases, provided a better host for seed germination than rich soil.

A significant feature of the products of this invention is that such materials are substantially bacteria free as they exit from the dryer. Thus, the products of this invention may be used for land-fill and other uses without substantial subsequent auto-decay occurring. The product upon standing, soon acquires aerobic bacteria but these bacteria do not initiate rapid decay. Also, by storing the product in closed containers the presence of aerobic bacteria can be minimized. The material can be used for any land-fill purpose without attracting numerous vermin, insects, and the like and without emitting any disagreeable odor. It has been found that the material does not emit any objectionable odor or become subject to any substantial decay upon becoming wet with water.

A further feature of the products of the instant invention is that these products do not support combustion in bulk form. The materials tend to smolder so long as a flame is held in contact therewith, but when the flame is removed, combustion ceases. The material can readily be used for insulation purposes in bulk form because it has a low bulk density and is porous.

Although the process of the instant invention can be operated in a manner which produces a product which is not substantially biologically stable, it is preferred to produce a biologically stable product. A biologically stable product having a low bulk density and plant food value can be utilized for numerous household gardening purposes as well as for clean land-fill purposes. Also, the product can be used as reinforcement or bulk additives in plasterboard, concrete, and other structural products.

Because of the nature of the above-described process for treating waste materials the products of this invention generally have a substantial quantity of fractured structural cells. Grinding under cryogenic temperatures tends to rupture cells which contain moisture, therefore, it is possible to remove readily moisture which would be especially difficult to remove in any other fashion. Also, the fracturing of cells at the low temperatures gives the final product a different structural characteristic than products ground at elevated temperatures, that is, at room temperature or above.

EXAMPLE

A quantity of partially decayed garbage was treated according to the practice of this invention.

The garbage composition was as follows:

| Solids | % by wt. |
|---|---|
| Paper Products | 65 |
| Rubber and Plastics | 12 |
| Food (vegetable and meat waste) | 22 |

The above composition does not reflect values for small quantities of aluminum and glass present. The above composition reflects dry weights. The garbage had a moisture content greater than about 50 percent by weight.

The feed materials were reduced in size to a fragment range of about 1 to 2 inches. The shredded material was cooled to a temperature of about −250° F. by contact with liquid nitrogen. The material quickly became embrittled and was then ground to a particle size of about 1/32 to about ¼ inch while cryogenic temperatures were maintained.

The frozen comminuted fragments were then heated in the presence of hot, dry air to a temperature of about 250° F. The resulting product was very dry, possessing a moisture content of less than about 5 percent by weight.

The product was substantially organic in nature. The individual fragments were fibrous and porous, having a thin, leaf-like structure. The product had a discernible, but not noxious, odor for the first few days. After that, no odor was detectible even when the product became wet.

For the first few days the product remained warm, apparently having heat generated from slight bacterial action. Afterwards, the product exhibited no exothermic nature and assumed ambient temperature. A fresh sample of product was capped with an expansible membrane attached to determine gas emission. No detectable gas emission resulted during a 9 week period.

The effect of water on the dry product was tested by placing a small quantity in a container partially filled with water. The container was then sealed. Substantially all of the fibrous products floated on the water and remained afloat for a 9 week period. Small white fungi were noted growing on the material after about one week and the color of the floating material changed from brown to black.

The presence of fungi on the wet product is some indication that the environment was slightly acidic. However, when a sample of the product was ground extremely fine and dissolved to the greatest extent possible in water, a neutral pH reading was obtained. Since fatty acids, nucleic acids and the like are present in vegetable and meat wastes and various paper dyes are acidic, a slightly acidic product would be expected. The product, however, did not exhibit detectable acidity.

The dried product was compared with a sample of material derived from comparable feed materials which had been ground and dried at room temperatures. The later material had a noxious odor which was still present after nine weeks. The product of the invention, by comparison, had a detectable, non-noxious odor for only about 3 days. When the two materials were exposed to flies it was noted that flies were not attracted by the product of the invention while they were strongly attracted to the air-dried, ambient-temperature ground garbage. Also, the product remained undisturbed when exposed to a rodent infested area.

The plant food value of the product was tested in comparison with typical Pennsylvania garden soil enriched slightly with peat moss, sand, and fertilizer. Seeds of identical type were planted in the product and in the enriched soil. After five days the seeds in the product had germinated while 14 days were required for germination in the enriched soil.

The product produced by the process described in this example had a very low bulk density and, in bulk form, was substantially non-combustible. Combustion continued so long as a flame was directed against the bulk material. Combustion ceased upon removal of the flame.

The fibrous, porous product also exhibited excellent adsorption of oil.

The process conditions established in this invention mitigate against a substantial bacteria count in the final product. Freezing does not necessarily destroy bacteria, but it retards bacterial action and multiplication especially among mesaphillic and thermophillic bacteria. The elevated temperatures encountered in the drying cycle destroys a substantial quantity of the bacteria present. The rapid heating of the product destroys bacteria before they can assume a morphological form more resistant to high temperatures. Spore forming bacteria are the most difficult to destroy and some spores undoubtedly survive in the product.

The low concentration of bacteria in the product do not cause substantial decay. The low moisture content of the product is detrimental to bacterial action. Also, since the bacteria present in the contaminated feed material are primarily heterotropic, subsisting on proteins, fats, carbohydrates, and amino acids, such bacteria remaining in the final product have a limited supply of nutrients available. The food waste portions of the feed material generally comprise only about 10 percent to about 40 percent by weight of the organic matter present. In the final product, the dried fragments derived from food waste are preferably uniformly distributed through the product. Therefore, no concentrated accumulation of bacteria nutrient exists in the final product. The high percentage of cellulosic material in the final product, generally from about 40 percent to about 90 percent by weight, which is derived from paper products and vegetable waste, can be utilized as a carbon source for heterotropic bacteria but a limited supply of nitrogen from amino acids and the like is available for substantial bacterial growth.

The novel products of this invention may be produced in a batch or continuous process. The batch method is practiced and set forth in the above example while the same temperature parameters set for the continuous process are observed. In either process mode the drying of the product is accomplished by hot, dry air. The continuous process is preferably practiced by using a combination of dry ice and liquid nitrogen cooling. A biologically stable product having substantially identical physical, chemical and biological properties is produced by either batch or continuous processing.

The novel product of this invention has an organic content having a fixed carbon range of from about 8 percent to about 15 percent by weight, a volatility content of at least 30 percent by weight and generally from about 50 to 80 percent by weight. The bulk density of the product is generally from about 1 to about 10 pounds per cubic foot, although generally less than about 5 pounds per cubic foot.

Although the invention has been described hereinabove by reference to specific embodiments it is not intended that it be limited solely thereto but to include all the variations and modifications falling within the scope of the appended claims.

I claim:

1. A process for converting municipal refuse containing bacteria contaminated organic matter having a substantial moisture content to a substantially dry, biologically stable product comprising:
   a. shredding said refuse to obtain a small particle size;
   b. cooling said refuse to a temperature sufficiently low to cause embrittlement thereof;
   c. comminuting said brittle refuse while maintaining a very low temperature;
   d. heating and drying said cold, comminuted material to reduce the moisture content thereof to less than about 10 percent by weight and to raise the temperature thereof above about 150° F.

2. The process of claim 1 wherein the refuse is treated prior to shredding to remove ferrous materials.

3. The process of claim 1 wherein the refuse is pre-cooled in a pre-cooling zone before the temperature is lowered sufficiently to cause embrittlement thereof.

4. The process of claim 3 wherein dry ice is the cooling agent in the pre-cooling zone.

5. The process of claim 4 wherein a vacuum is applied to the pre-cooling zone.

6. The process of claim 3 wherein the temperature of the refuse is lowered to about −30° F. or below.

7. The process of claim 5 wherein the temperature is lowered to about −60° F. or below.

8. The process of claim 3 wherein the pre-cooled refuse is further cooled at least to an embrittlement temperature by evaporation of a liquefied gas.

9. The process of claim 8 wherein the liquefied gas is nitrogen.

10. The process of claim 8 wherein the temperature of the refuse is lowered to about −200° F. or below.

11. The process of claim 9 wherein the temperature of refuse is lowered to about −250° F. or below.

12. The process of claim 1 wherein said comminuting of brittle material is conducted at cryogenic temperatures.

13. The process of claim 1 wherein the comminuted refuse material is contacted with hot air.

14. The process of claim 13 wherein the refuse is contacted counter-currently with hot air.

15. The process of claim 14 wherein the temperature of the refuse material is rapidly raised over a temperature differential of at least 400° F.

16. The process of claim 14 wherein the temperature of the refuse material is rapidly raised over a temperature differential of at least 500° F.

17. The process of claim 1 wherein the refuse is compacted prior to shredding.

* * * * *